(12) United States Patent
Brummer et al.

(10) Patent No.: US 6,443,033 B1
(45) Date of Patent: Sep. 3, 2002

(54) TWO-PIECE BICYCLE CRANKSET

(76) Inventors: Timothy Eugene Brummer, 1308 W. Willow Ave., Lompoc, CA (US) 93436; Brian R. Spence, 4489 Chaparral Dr., Carpinteria, CA (US) 93013

( * ) Notice: Subject to any disclaimer, the term of this patent is extended or adjusted under 35 U.S.C. 154(b) by 0 days.

(21) Appl. No.: 09/473,827

(22) Filed: Dec. 23, 1999

Related U.S. Application Data

(63) Continuation of application No. 08/836,000, filed on Apr. 11, 1997, now abandoned.

(51) Int. Cl.$^7$ .................................................. G05G 1/14
(52) U.S. Cl. ..................... 74/594.1; 74/594.2; 280/259; 280/281.1; 384/545
(58) Field of Search ........................ 74/594.1, 594.2; 280/259, 281.1; 384/545, 626, 537

(56) References Cited

U.S. PATENT DOCUMENTS

| | | | | |
|---|---|---|---|---|
| 622,644 A | * | 4/1899 | Annable | 74/594.1 |
| 623,373 A | * | 4/1899 | Jerome | 74/594.1 |
| 627,597 A | * | 6/1899 | Scott | 74/594.1 |
| 648,077 A | * | 4/1900 | Ludlow | 74/594.1 |
| 650,412 A | * | 5/1900 | Mclellan | 74/594.1 |
| 846,239 A | * | 3/1907 | Osborne | 74/594.1 |
| 3,906,811 A | * | 9/1975 | Thun | 74/594.1 |
| 5,493,937 A | * | 2/1996 | Edwards | 74/594.1 |
| 5,586,472 A | * | 12/1996 | Lin | 74/594.1 |
| 5,924,336 A | * | 7/1999 | Richardson | 74/594.1 |
| 6,116,114 A | * | 9/2000 | Edwards | 74/594.1 |

FOREIGN PATENT DOCUMENTS

| | | | | |
|---|---|---|---|---|
| FR | 2615160 | * | 11/1988 | 74/594.1 |

* cited by examiner

*Primary Examiner*—Vinh T. Luong
(74) *Attorney, Agent, or Firm*—Michael G. Petit

(57) ABSTRACT

A crankset for a bicycle in which the crankshaft separates into two pieces. The separation point is approximately midway between the support bearings for the crankshaft, creating two crankarm/spindle portions. Dowel pins and a bolt are used to connect the two portions. The crankarm/spindle portions are constructed in a tubular fashion, with the tubular element bent to accommodate the transition from the crank arm to the spindle. Additionally, the crankarm/spindle portions are preferably fabricated from composite materials, to offer a lightweight yet strong and stiff crankset.

9 Claims, 5 Drawing Sheets

TWO-PIECE BICYCLE CRANKSET

CROSS REFERENCE TO RELATED APPLICATIONS

This is a continuation of abandoned U.S. Ser. No. 08/836,000, filed Apr. 11, 1997.

BACKGROUND OF THE INVENTION

1. Field of the Invention

The present invention is in the field of bicycles and tricycles, and more particularly relates to bicycle cranksets, and to construction methods and assembly means of such cranksets. For the purposes of this invention, a crankset is defined as a combination of a crankshaft, the crankshaft mounting bearings, and chain drive sprocket(s), or a means for mounting chain drive sprocket(s).

2. Prior Art

Bicycles have been used as a means of transportation and recreation for hundreds of years. During the entire existence of the bicycle, in order to increase performance, continual efforts have been underway to reduce the weight of the bicycle without reducing strength and/or stiffness. For optimum performance, a bicycle needs adequate stiffness so that pedaling energy is used for propelling the bicycle forward, rather than being absorbed in the flexing of structural components. It also needs to have adequate strength in order to prevent breakage under pedaling loads. Both cases preclude the possibility of reducing the weight of bicycles merely by reducing the amount of material used. However, in recent years, new lightweight, yet very strong, materials developed for the aerospace industry have been employed for use in bicycle structures. One example of these materials is a composite of carbon fibers bonded together with epoxy resin. This material, when properly designed and formed, can have the same strength and stiffness as an alloy steel structure, but only weigh ½ to ⅓ as much.

Carbon fiber/epoxy composites have been successfully used to make bicycle frames and rims that are lighter and stronger compared to metal frames and rims.

U.S. Pat. No. 4,704,919 to Durham discloses a two piece bicycle crankshaft. In the Durham device, rather than separating in the middle, one arm separates from one end of the spindle.

Attempts have been made at producing cranksets partly constructed from carbon fiber composite materials. Unfortunately, none of these cranksets have displayed any significant advantage over cranksets constructed of metal. One reason for this appears to be an incompatibility of carbon fiber/epoxy composites with the 3-piece type of crankshaft most modern lightweight, high performance bicycles employ, and upon which the carbon fiber crankshafts are based. In these type of crankshafts, a separate metallic spindle is mounted on bearings housed in the crank tube of a bicycle frame. Two crank arms, one on either side, are then attached to the spindle, normally by means of a mating four-sided taper and attachment bolt. The currently available carbon fiber crankshafts retain the metallic spindle and incorporates carbon fiber composites into the crankarms.

Carbon fiber composite crankarms are at a disadvantage when this type of connection between the arms and spindle is used, because it is not possible to economically produce a reliable four-sided mounting taper in carbon fiber. Therefore, this mounting taper on previous carbon fiber crankarms has been constructed from aluminum, and this aluminum portion is then adhesively bonded in some fashion to the carbon fiber.

The resulting structure is not significantly lighter nor stronger than standard forged aluminum crankarms, but it is much more expensive to manufacture. Because of this, existing carbon fiber crankarm designs have very small demand and sales, and are not a viable, profitable business investment.

Others have attempted to produce lightweight, yet strong and stiff bicycle cranksets by utilizing a two-piece metal design. In these designs, one crankarm is welded to the spindle, while the other arm is attached to the spindle with a splined connection. While this type of crank design is perhaps somewhat better than conventional three piece crankset designs, it still has limitations in that they are limited to a single material, such as steel, aluminum, or titanium.

U.S. Pat. No. 529,110 to Copeland discloses a two-piece bicycle crankshaft in which the two crankshaft halves are held together by an external threaded sleeve, rather than an internally housed tension bolt. The Copeland crankshaft is solid, with no mention made about utilizing a hollow crankshaft. Finally, the torque coupling illustrated is a tongue-and-groove type, rather than the dowel pins used in the present invention.

There accordingly remains a need for a design and construction which avails itself to optimum use of advanced composite materials.

SUMMARY OF THE INVENTION

In the present invention, a two-piece crankshaft has been developed in order to eliminate the heavy, inefficient tapered connection between the two crankarms and the spindle of conventional three-piece designs. The connection between the two pieces is located between the crankshaft supporting bearings, allowing the structure to be further optimized for the highest strength and stiffness for the least amount of weight.

In a preferred embodiment, the connecting point of the two pieces of the crankshaft is midway between the supporting bearings upon which the crankshaft is rotatably mounted to the bicycle frame crank tube. This arrangement allows for large diameter, tubular type structures to be used for not only the crank arms, but also for the spindle. Additionally, it allows for the spindle diameter to be approximately as large as the crank arm diameter, this in turn allows for each crankshaft half to be constructed from one continuous curved piece. The preferred embodiment includes a pair of one piece carbon fiber crankarms with integrated steel spindle portions bonded to them, and are referred to hereinafter as crankarm/spindle portions.

The inside face of each crankarm/spindle portion has a flattened end. Dowel pins are mounted on one of the flattened ends, and these pins engage with matching holes provided in the flattened end of the other crankarm/spindle portion. The dowel pins transfer the torque and bending loads from one crankarm/spindle portion to the other portion. The two crankarm/spindle portions are rigidly and detachably held together with a single bolt, which detachably yet securely fastens the flattened ends of the crankarm/spindle portions together.

The present invention also incorporates a novel pedal attachment fitting method at the other end of the crankarms, where the pedal attaches. The pedal attachment fitting is internally bonded in the tubular carbon fiber crankarm structure.

The preferred embodiment has several advantages over other crankset designs, including:

a) A lighter yet stronger and stiffer crankset;

b) A design which accommodates economical use of composite materials;

c) Rapid assembly and disassembly of the entire crankset;

d) Quick and easy removal of the one crankarm/spindle portion which carries the chain drive sprocket(s). This in turn allows for the easy change out of sprockets of various sizes;

e) Special tools are not required to separate the crankarm/spindle portions;

f) A single mold can be used for the construction of various crankarm lengths, rather than multiple molds. The carbon fiber crankarm can be cut off to the desired length, after which the pedal attachment fitting will then be bonded inside it.

The novel features which are believed to be characteristic of the invention, both as to organization and method of operation, together with further objects and advantages thereof, will be better understood from the following description of the accompanying drawings of the preferred embodiment of the invention. It is to be expressly understood, however, that the drawings are for the purpose of illustration and description only, and are not intended as a definition of the limits of the invention.

DETAILED DESCRIPTION OF THE PREFERRED EMBODIMENT

Figure 1:
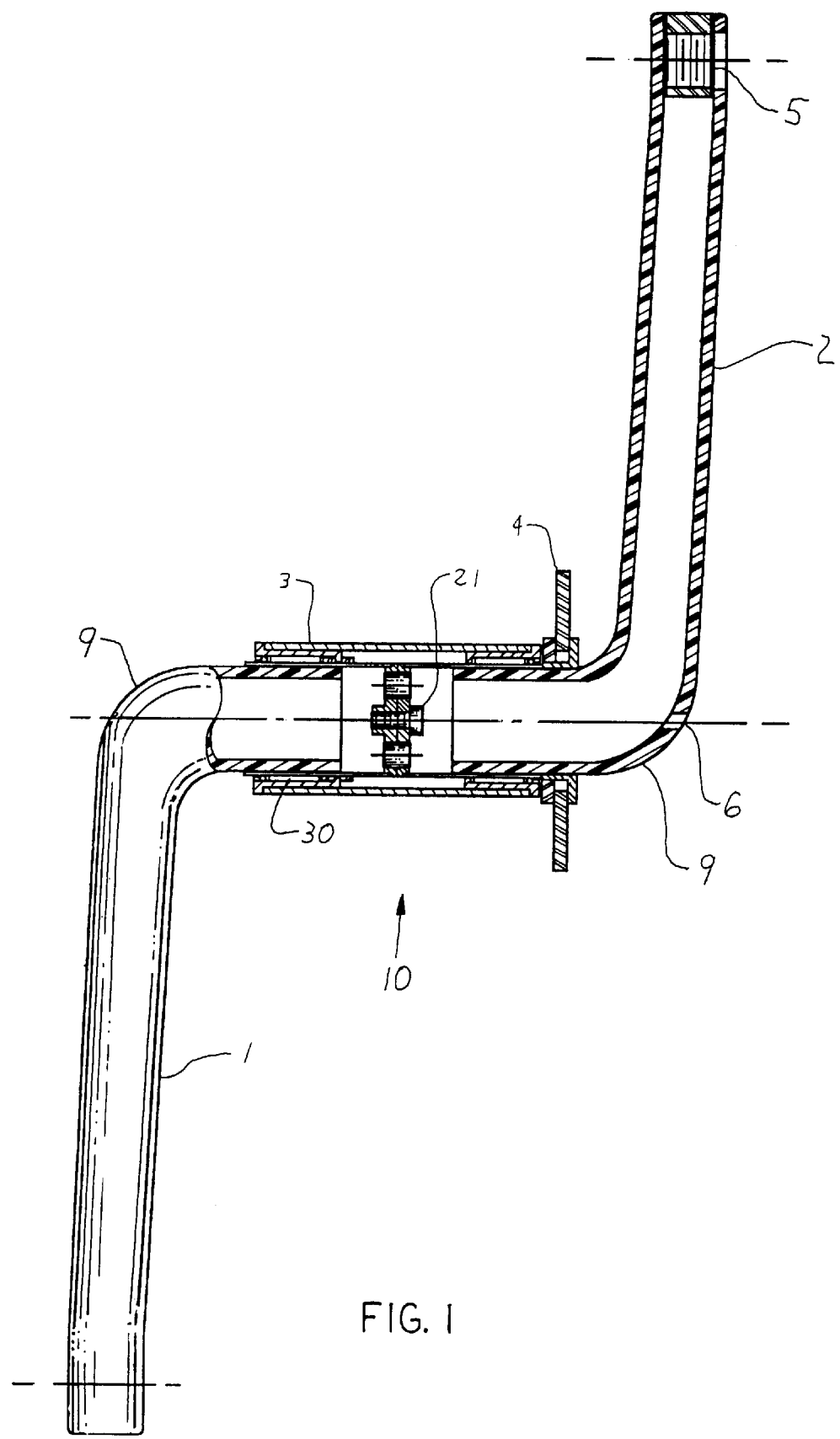
FIG 1 is a partial sectional plan view of the two-piece bicycle crankset of the invention, which is shown mounted in a bicycle frame crank tube.

Referring to FIG. 1, the crankset 10 consists of a left crankarm/spindle portion, 1 and a right crankarm/spindle 1 and 2 portion 2. The two crankarm/spindle 1 and 2 portions are securely connected together by a tension bolt 21, which is housed inside of the right crankarm/spindle 1 and 2 portion 2. Additionally, the two crankarm/spindle 1 and 2 portions are shown rotatably mounted inside of a bicycle frame crank tube 3 by means of needle bearings 30.

Also shown in FIG. 1 is a chain drive sprocket 4, and a pedal attachment fitting 5; both shown mounted to the right crankarm/spindle assembly 2.

Figure 2:
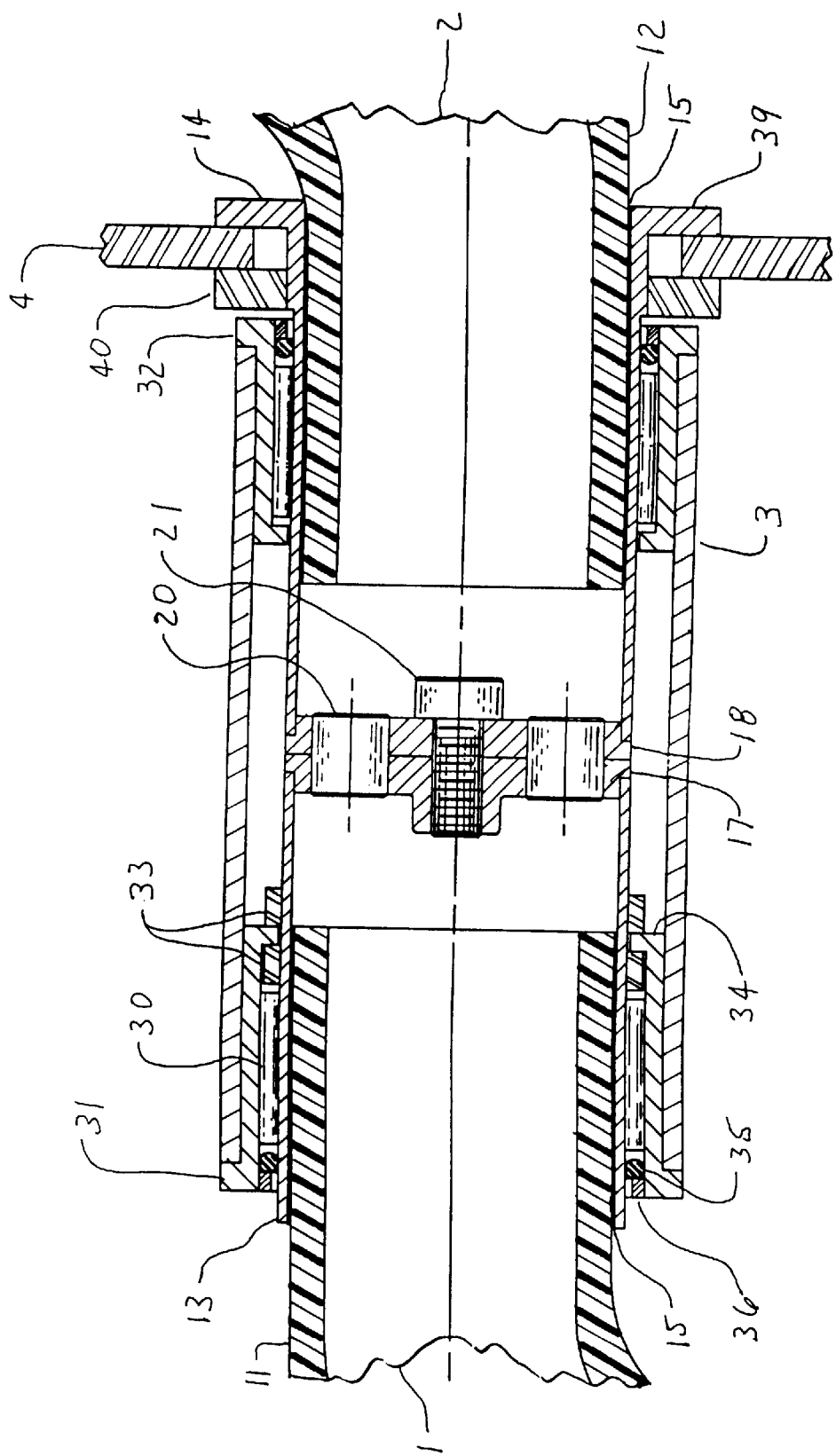
FIG. 2 enlarged view of FIG. 1, showing in detail two-piece crank spindle mounted on bearings supported by the bicycle frame crank tube, and associated parts.

Referring to FIG. 2, the integration of the crankarm/spindle 1 and 2 portions and their installation into the bicycle frame crank tube 3 can be seen in greater detail. The crankarm/spindle halves 1 and 2 consist of crankarms 11 and 12, spindles 13 and 14, and spindle plates 17 and 18.

In the preferred embodiment, the crankarms 11 and 12 are molded from a carbon fiber/epoxy composite material. The crankarms 11 and 12 are preferably hollow, in order to minimize weight. Note that each crankarm 11 and 12 is not straight along its' entire section; instead they curve inward approximately 90 degrees at the inboard bent end 9 in order to mate up with the spindles. See FIG. 1. The spindles 13 and 14, and spindle plates 17 and 18, are preferably constructed of alloy steel. The spindles are preferably welded to the spindle plates, 17 and 18 then the entire weldments are heat treated to a high tensile strength, and precision ground to the final required outside dimension. The heat treating and grinding are required because needle bearings 30 ride upon the spindle, and these bearings require a smooth, hard surface for maximum life and minimum friction. The carbon fiber crankarms 11 and 12 can then be attached to the inside of the spindles 13 and 14 by means of a high strength adhesive 15, preferably epoxy based.

Protrusion means, such as a plurality of dowel pins 20, are installed into the spindle plates 17 and 18. These dowel pins are installed with a press fit into appropriately sized apertures, i.e. holes 19, formed in the right plate 18. The holes 19 for the pins 20 in the left plate 17 have a close tolerance clearance fit. This arrangement allows for ease of assembly and disassembly, as the pins 20 are retained by the right plate, but also easily insert into the holes 19 in the left plate. The dowel pins 20 transfer the torque and bending loads from one crankarm/spindle portion to the other portion. The single tension bolt 21 connects the two portions 1 and 2 together, and transfers the tension loads from one to the other. Once connected together by the dowel pins 20 and the tension bolt 21, the two spindle portions 1 and 2 will more or less have the same structural characteristics and behave much as a more conventional one piece spindle.

As mentioned earlier, the spindle halves 13 and 14 form the inner bearing race for needle bearings 30. Outer bearing races are provided by the bearing cups 31 and 32. These cups are, like the spindles, hardened and ground alloy steel to provide a proper surface for the bearings to ride upon. The bearing cups are either threaded or pressed into the bicycle frame crank tube 3.

The connected crankarm/spindle assembly is prevented from sideways movement by the thrust bushings 33. These thrust bushings are pressed onto the left spindle 13, and engage a lip 34 provided on the left bearing cup 31.

Dirt is prevented from entering the bearings, and grease is kept inside the bearings, by the seals 35. These seals are preferably made from a rubber type material. The seals are kept in their proper position inside the bearing cups 31 and 32 by the retainers 36. These retainers are pressed into the bearing cups.

The chain drive sprocket 4 is shown mounted to the right spindle 14. It is held in place against a lip 39 on the spindle by a lock ring 40. This lock ring is threaded into place on the spindle, and tightens to retain the chain drive sprocket.

Figure 3:
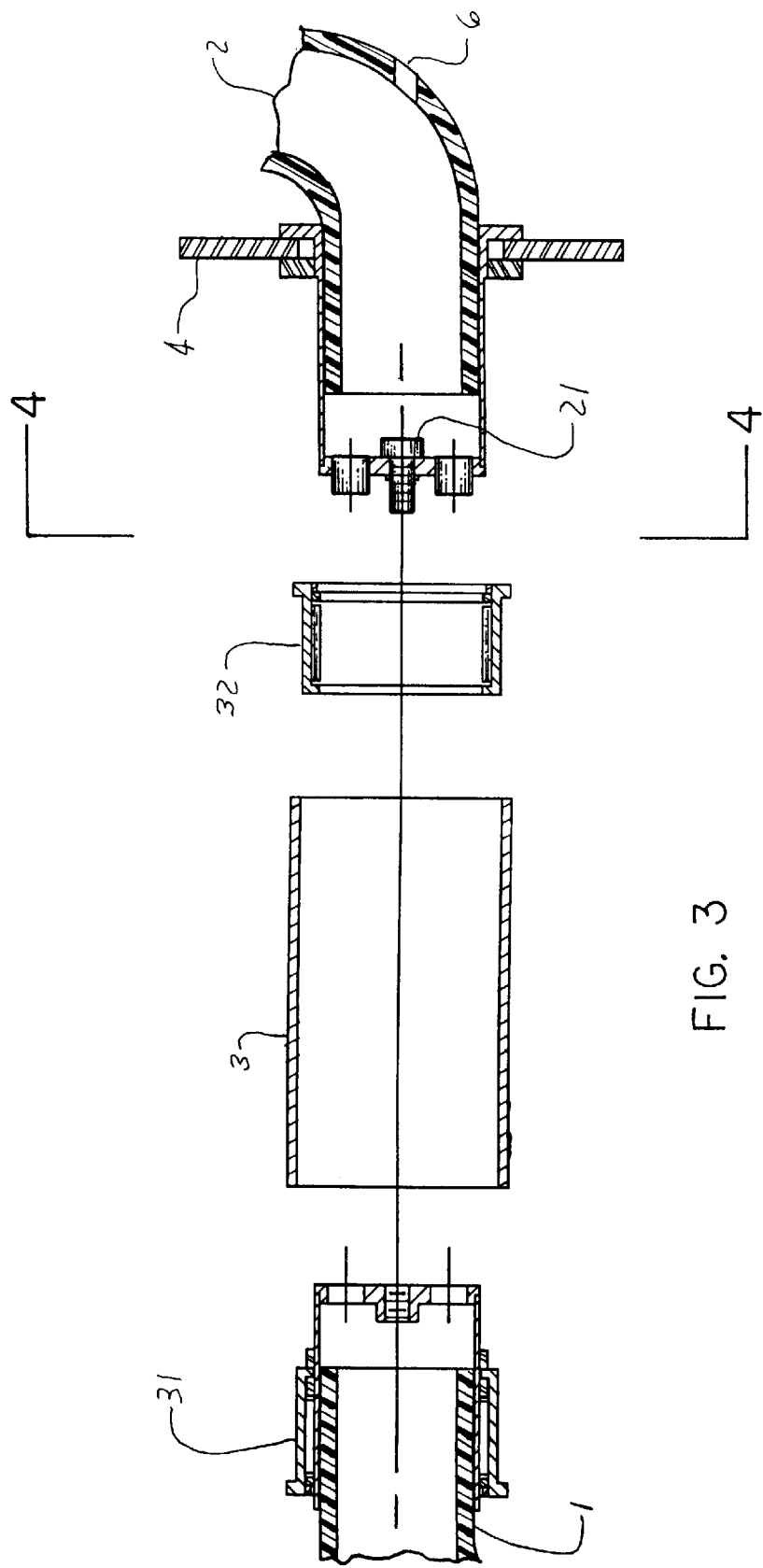
FIG. 3 an exploded view of the two-piece crank set of FIG. 1, illustrating how the two crankarm/spindle portions install into the bicycle frame crank tube.

FIG. 3 further details the installation method of the crankset into the bicycle frame crank tube 3. The bearing cup 31, with its attached left crankarm/spindle half 1, is pressed or threaded into the crank tube. The right bearing cup 32 with bearings is also pressed or threaded into the crank tube. The bearing cups, and the left crank/spindle half, are normally left installed in the crank tube, and would only infrequently be removed to replace failed bearing components.

The final component to be assembled is the right crankarm/spindle portion 2. This unit simply slides into place through the needle bearings, and is retained in place by the tension bolt 21. This tension bolt is preferably has an Allen wrench head, which allows the bolt to be tightened by insertion of an Allen wrench through the hole 6 provided in the right crankarm.

Note that this arrangement allows the right crankarm/spindle half to be easily removed, this in turn allows for the easy change out of chain drive sprockets 4 of various sizes. This feature can be seen more clearly by referring to FIG. 4.

Figure 4:
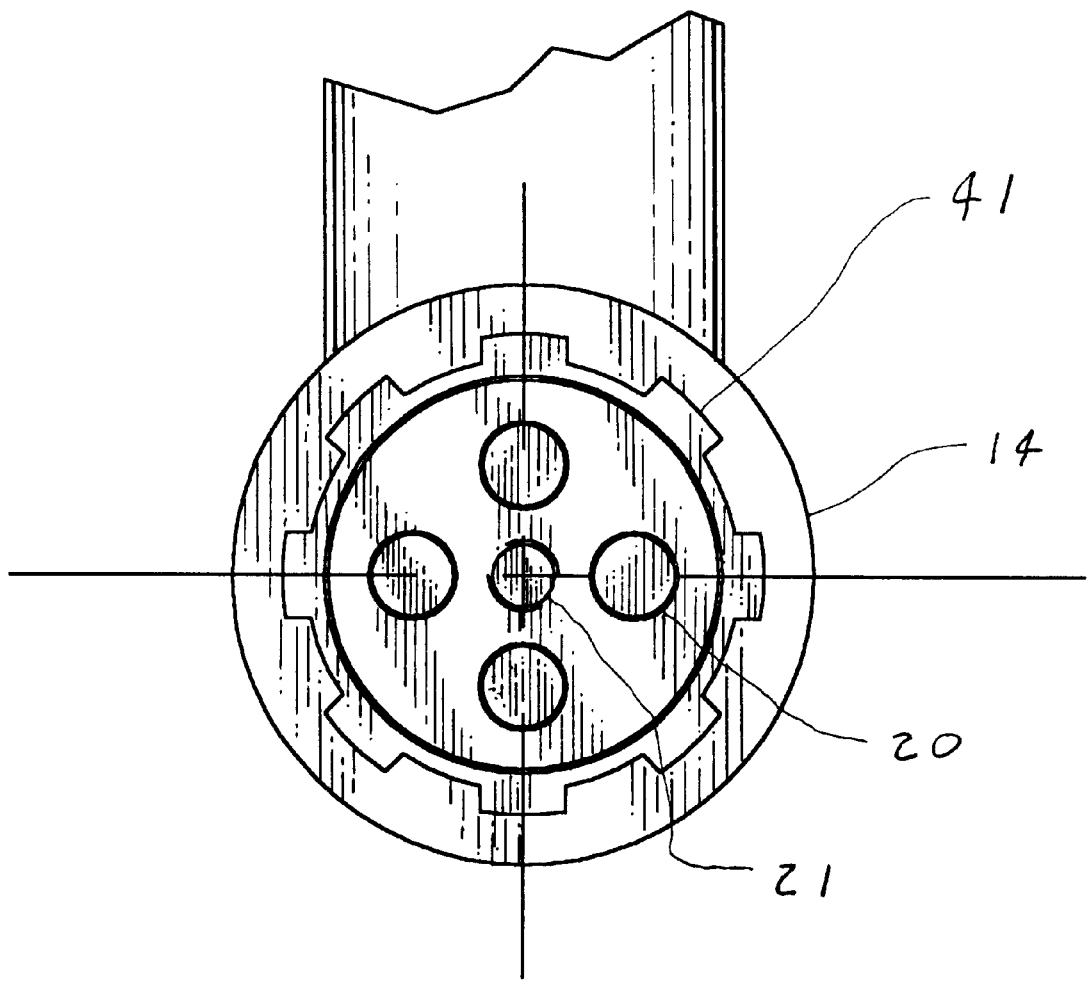
FIG. 4 is an end of the right side spindle portions through view, lines 4—4 of FIG. 3, shown mounting spline for a chain drive sprocket.

Splines 41 can be seen in FIG. 4; these splines are an integral part of the right spindle 14. The splines 41 engage matching splines provided on the chain drive sprocket(s), not shown. Also seen in FIG. 4 are the four dowel pins 20, mounted in their respective holes, and the tension bolt 21 mounted in its hole.

Figure 5:
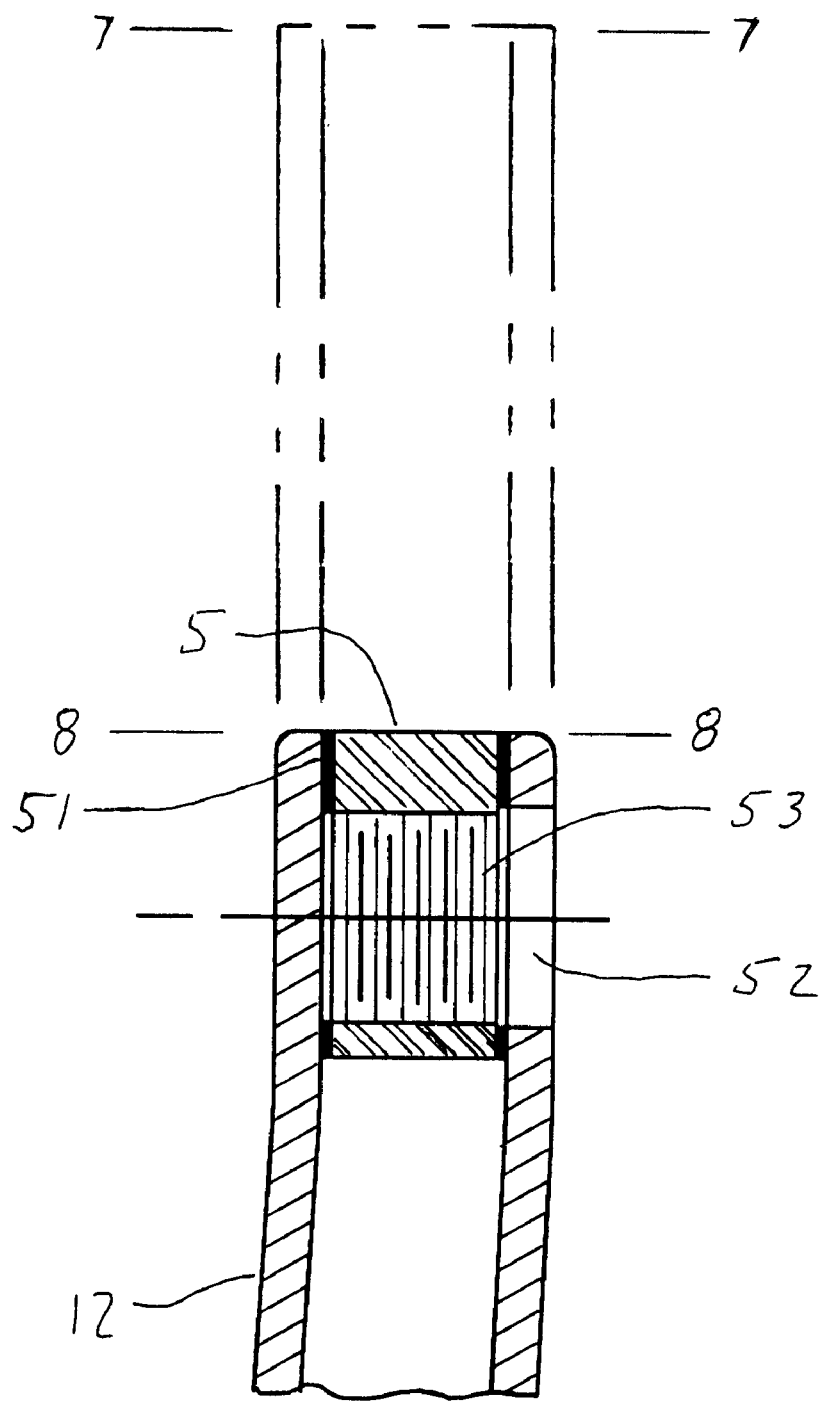
FIG. 5 is an enlarged view of the right crankarm of FIG. 1, illustrating the pedal attachment fitting installation in greater detail.

FIG. 5 illustrates the combination crankarm end and pedal attachment fitting 5 in the right crankarm 12. As can be seen, the fitting inserts into the open end of the crankarm (shown at section line 8—8), closing it off. The fitting is preferably constructed of aluminum alloy, and bonded to the crankarm by an adhesive 51. A hole 52 is provided in the outer face only of the crankarm, and threads 53 in the fitting to permit installation of a pedal to the crankarm. A similar fitting is installed into the left crankarm, but is not illustrated.

It can be seen from FIG. 5 that it is relatively easy to mold or form a crankarm 12 of relatively long length 7. The crankarm can then be easily cut off at a desired point 8, thereby producing a length that matches the bicycle riders anatomy in an optimum fashion, so that maximum power output can be produced. After the excess portion of the crankarm is cut off, the hole 52 can be drilled, and the pedal fitting 5 bonded into place, producing a completed crankset.

It should be noted that needle bearings have been illustrated in this embodiment of the invention. This was done because it is desirable to have an relatively large diameter spindle in order to obtain the maximum structural strength and stiffness possible per unit weight. However, because the crank tubes on existing bicycles are relatively small, needle bearings are the only type that fit in the remaining small space.

However, in the future, it would be more desirable to equip bicycles with a larger diameter crank tube, as this would allow the more common ball bearings to be fitted.

The foregoing detailed description is illustrative of one embodiment of the invention, and it is to be understood that additional embodiments thereof will be obvious to those skilled in the art, such as a pedal fitting not being a crankarm end fitting. The embodiments described herein together with those additional embodiments are considered within the scope of the invention.

What I claim:

1. A two-piece crankset, comprising a pair of crankarm-spindle portions, each having a hollow crankarm portion with a free end adapted to engage a pedal, and a bent end, and a spindle portion continuous with the bent end, wherein the spindle portions of each of the pair of crankarm-spindle portions comprise a disc-shaped spindle plate and a spindle, the spindle comprising tubular sections with flattened planar ends, the flattened planar ends adapted to abut opposing surfaces of said spindle plate, and wherein each crankarm-spindle portion has an engagement means on the spindle portion adapted to engage with the other spindle portion, so that the spindle portions can be detachably yet rigidly attached together, and wherein the engagement means comprises at least one protrusion on a flattened planar end of one of the spindle portions, the at least one protrusion being adapted to fit into at least one complementary aperture formed on a flattened planar end of the other of the spindle portions of the pair of crankarm-spindle portions, and a bolt to hold the spindle portions in rigid interconnection wherein the tubular section and flattened planar ends are metallic, and the crankarm portion and a portion of the spindle portion which engage the tubular section comprise composite materials, the metallic tubular sections being bonded with an adhesive to the composite materials of the spindle portion.

2. A two piece composite crankset comprising:
   a pair of crankarm-spindle portions, each having a hollow crankarm portion with a free end and a bent end, and a spindle portion attached to the bent end of the crankarm portion, the spindle portion comprising a tubular member, the crankarm portion being formed of a composite material, and the spindle portion being formed of metal;
   a threaded pedal engagement insert portion operable for threadingly engaging a bicycle pedal, adhesively bonded in the free end of the hollow crankarm portion; and
   engagement means on the spindle portion of each crankarm-spindle portion comprising at least one protrusion formed on the spindle portion and at least one open aperture formed on the other spindle portion, the aperture being sized and aligned to tightly receive the protrusion, and a bolt to tightly yet releasably bolt together the spindle portions.

3. The two-piece crankset of claim 1, wherein the first free ends of the crankarm portions are adapted to be cut in length, and have a hole formed through an outside wall of the crankarm to be in alignment with the threaded insert portion to be inserted therein.

4. The two-piece crankset of claim 1, wherein the crankarm portion and the portion of the spindle portion which engages the bent end of the crankarm portion are bonded together with an adhesive.

5. The two-piece crankset of claim 1, wherein the composite material comprises carbon fibers and resins.

6. The two-piece crankset of claim 1, wherein the tubular sections of the spindle portions provide a precision rolling surface upon which bearings can roll.

7. The two-piece crankset of claim 1, wherein an access hole is provided in one crankarm to provide access to the bolt.

8. The two-piece crankset of claim 1, wherein the first free ends of the crankarm portions are perpendicular to an axis of the spindle portions.

9. A two piece composite crankset, comprising:
   a pair of crankarm-spindle portions, each having a hollow crankarm portion with a free end and a bent end, and a spindle portion attached to the bent end of the crankarm portion, the spindle portion comprising a tubular member, the crankarm portion being formed of a composite material, and the spindle portion being formed at least partially of metal, wherein the crankarm portion gradually bends and attaches to the spindle portion;
   a threaded pedal engagement insert portion operable for threadingly engaging a bicycle pedal, is affixed in the free end of the hollow crankarm portion; and
   engagement means on the spindle portion of each crankarm-spindle portion comprising at least one protrusion formed on one spindle portion and at least one aperture formed on the other spindle portion, the aperture being sized and aligned to tightly receive the protrusion, and a bolt to tightly yet releasably bolt together the spindle portions.

* * * * *